US012057645B2

(12) United States Patent
Garren

(10) Patent No.: US 12,057,645 B2
(45) Date of Patent: Aug. 6, 2024

(54) COMMUNICATION DEVICE RADIATING PURELY DIPOLE STRUCTURE

(71) Applicant: THE UNITED STATES OF AMERICA, AS REPRESENTED BY THE SECRETARY OF THE NAVY, Arlington, VA (US)

(72) Inventor: David Alan Garren, Clifton, VI (US)

(73) Assignee: THE UNITED STATES OF AMERICA, AS REPRESENTED BY THE SECRETARY OF THE NAVY, Alington, VA (US)

( * ) Notice: Subject to any disclaimer, the term of this patent is extended or adjusted under 35 U.S.C. 154(b) by 0 days.

(21) Appl. No.: 17/865,884

(22) Filed: Jul. 15, 2022

(65) Prior Publication Data

US 2023/0090935 A1 Mar. 23, 2023

Related U.S. Application Data

(60) Provisional application No. 63/246,132, filed on Sep. 20, 2021.

(51) Int. Cl.
*H01Q 7/00* (2006.01)

(52) U.S. Cl.
CPC .................................... *H01Q 7/00* (2013.01)

(58) Field of Classification Search
CPC .................................. H01Q 7/00; H01Q 1/24
See application file for complete search history.

(56) References Cited

U.S. PATENT DOCUMENTS

| | | | | | |
|---|---|---|---|---|---|
| 5,654,723 | A * | 8/1997 | Craven | H01Q 7/00 343/866 |
| 2005/0088352 | A1* | 4/2005 | Parsche | H01Q 7/00 343/749 |
| 2007/0188397 | A1* | 8/2007 | Parsche | H01Q 1/42 343/788 |
| 2009/0009410 | A1* | 1/2009 | Dolgin | G01C 21/1654 324/345 |

* cited by examiner

*Primary Examiner* — Hai V Tran
*Assistant Examiner* — Michael M Bouizza
(74) *Attorney, Agent, or Firm* — Scott Bell; Heber Martin Carbajal

(57) ABSTRACT

The invention relates to a communication device radiating a purely dipole structure. The communication device includes a metallic sphere having a central axis and electrical wiring wound azimuthally around the central axis of the metallic sphere so that an electric current density of the electric wiring is proportional to a sine of a spherical elevation angle of the metallic sphere.

9 Claims, 4 Drawing Sheets

100

102

COMMUNICATION DEVICE RADIATING PURELY DIPOLE STRUCTURE

CROSS REFERENCE TO RELATED PATENT(S) AND APPLICATION(S)

This application claims the benefit of U.S. Provisional Application No. 63/246,132 filed Sep. 20, 2021, and entitled METHOD OF PURE MAGNETIC DIPOLE SPHERICAL ANTENNA WITH STRONG RESONANCES AT MULTIPLE OCTAVES, which is hereby incorporated in its entirety by reference.

BACKGROUND

Magnetic loop antennas are valuable for low frequency radar and communications applications, especially for frequencies below 1 MHz. The problem of computing the EM fields for a spherical electric current density appears to be relatively unstudied. However, there exists a rich history of prior research in circular magnetic loop antenna geometries. Initially, a number of researchers examined the far-field properties of circular current loops. In particular, Foster, in *Loop Antennas with Uniform Current* (1944), calculated the far-field EM fields for electric current loops with any radius relative to the radio frequency (RF) wavelength. In addition, Wu, in *Theory of Thin Circular Loop Antenna* (1962), further investigated thin circular loop transmitting antennas. Later, Greene, in *The Near Zone Magnetic Field of a Small Circular-Loop Antenna* (1967), developed the near-field properties for a small circular loop antenna.

In 1996, Werner and Overfelt independently developed infinite series expansions for the EM fields generated by arbitrary circular electric current loop density profiles. The particular expansions are different for these researchers, but their methods share a common feature in that both are based upon the calculation of vector potential functions. Both researchers showed that their EM-field series expansions agree with the expected farfield results. In the following year, Li et. al. developed yet another form of an infinite series expansion of the EM fields for a thin circular electric current loop based upon a Dyadic Green's function. Later analyses include that of Hamed and Abbas and Hamed in developing other forms of infinite series expansions for the EM fields for a thin current loop by using a scalar Green's function.

BRIEF DESCRIPTION

In accordance with one embodiment of the present disclosure, disclosed is a communication device radiating a purely dipole structure. The communication device includes a metallic sphere having a central axis and electrical wiring wound azimuthally around the central axis of the metallic sphere so that an electric current density of the electric wiring is proportional to a sine of a spherical elevation angle of the metallic sphere.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Embodiments herein describe a magnetic antenna that is based upon a spherical distribution of source electric current. Specifically, an antenna with a spherically shaped azimuthal electric current density with a magnitude that is proportional to the sine of the spherical elevation angle. A theoretic analytic investigation of the resultant electromagnetic (EM) fields has yielded an exact closed-form solution of Maxwell's equations which is expressed in terms of a small number of elemental functions. This emanated radiation has a purely dipole structure, with the absence of any higher order multipole contributions. This pure dipole property might offer new applications in radar and communications.

Figure 1A:
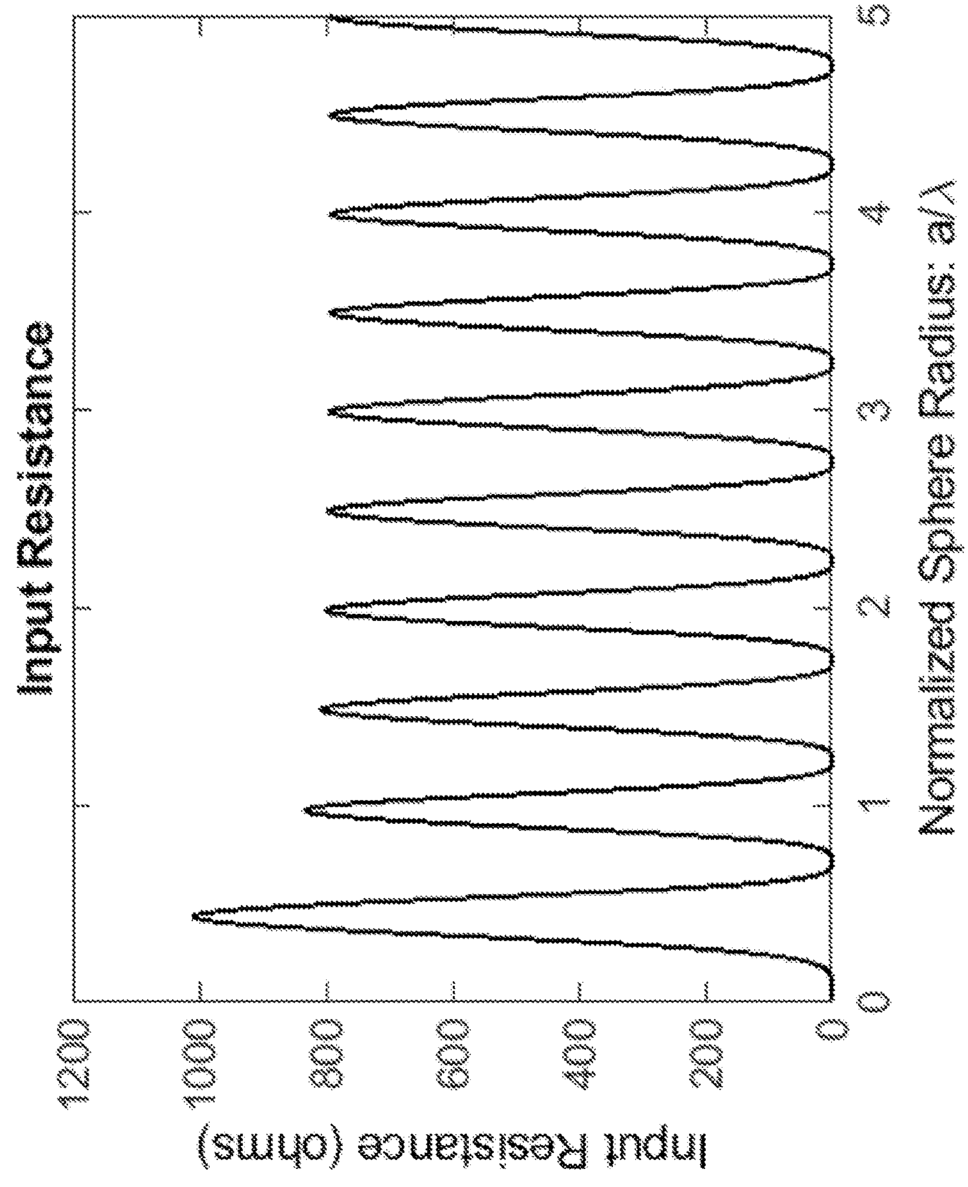
FIGS. 1A and 1B show input resistance and input reactance, respectively, for normalized sphere radiuses for embodiments described herein.
Figure 1B:
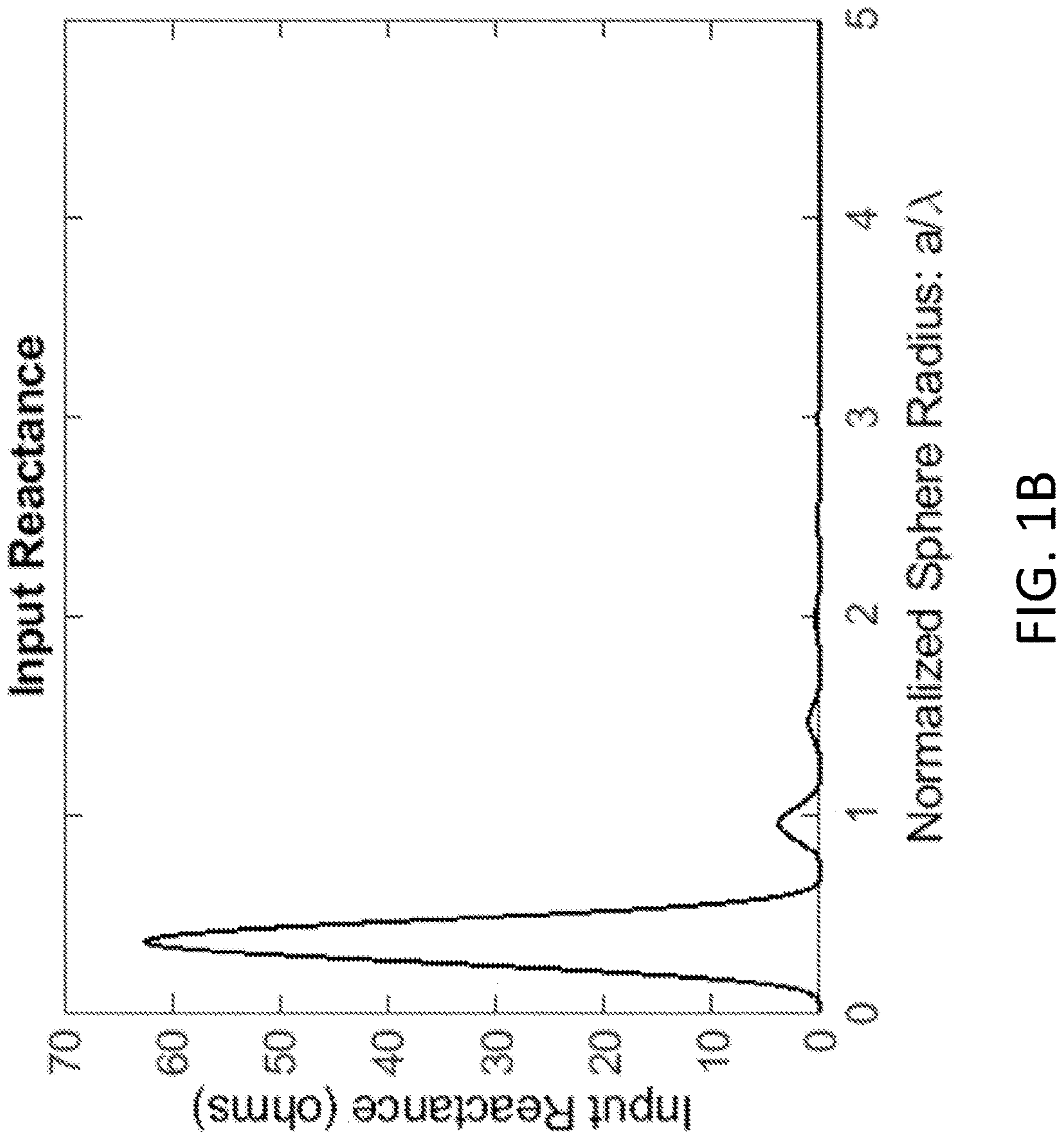

Further analysis of the embodiments has revealed that the EM fields can be expressed in terms of an alternative, and perhaps more intuitive, form such that the radial dependence varies as a product of polynomial and exponential functions. In addition, the subject spherical current density has been shown to produce the same purely dipole radiation fields exterior to the spherical current shell as that of an infinitely small magnetic dipole moment antenna. Furthermore, the description herein includes the calculation of various radiation properties corresponding to the subject spherical current antenna concept, including the Poynting vector, radiation impedance, quality factor, and maximum effective area. The radiation resistance exhibits strong resonances over many octaves of frequencies (as shown in 100, 102 of FIGS. 1A-1B), which could offer utility in the transmission and reception of waveforms for radar and communications applications.

Figure 2A:
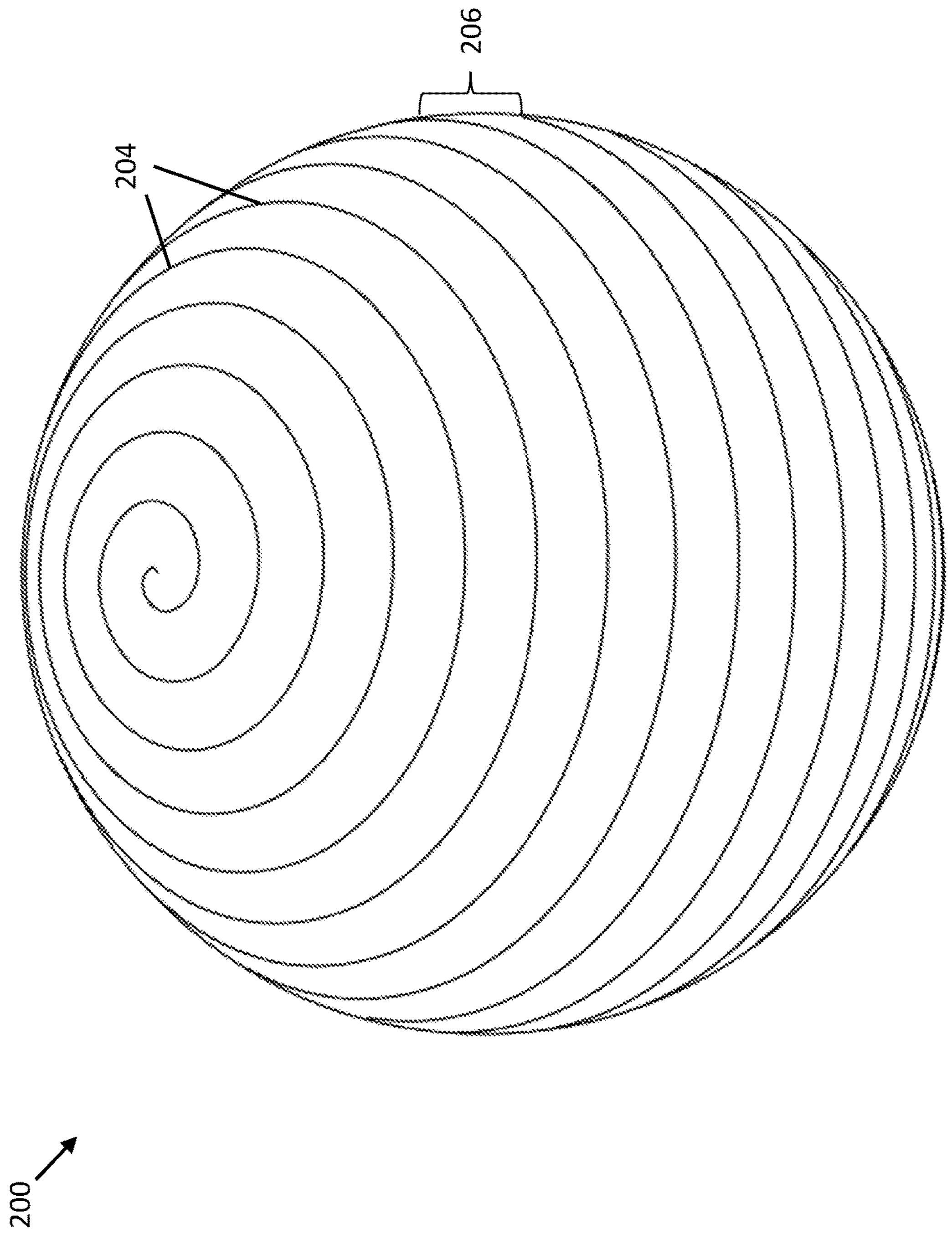
FIGS. 2A and 2B show various embodiments of spherical antenna.

In some embodiments, the subject invention can be implemented as a spherical dipole antenna 200 as shown in FIG. 2A. In FIG. 2A, the spherical antenna 200 includes an electric wire 204 wrapped around a sphere azimuthally about some central axis such that the density of the windings 206 is proportional to the sine of the spherical elevation angle. In some cases, there may exist various technical issues in attempting to generate approximate dipole EM fields in this manner, due to the mutual coupling of the various windings in such a design.

Figure 2B:
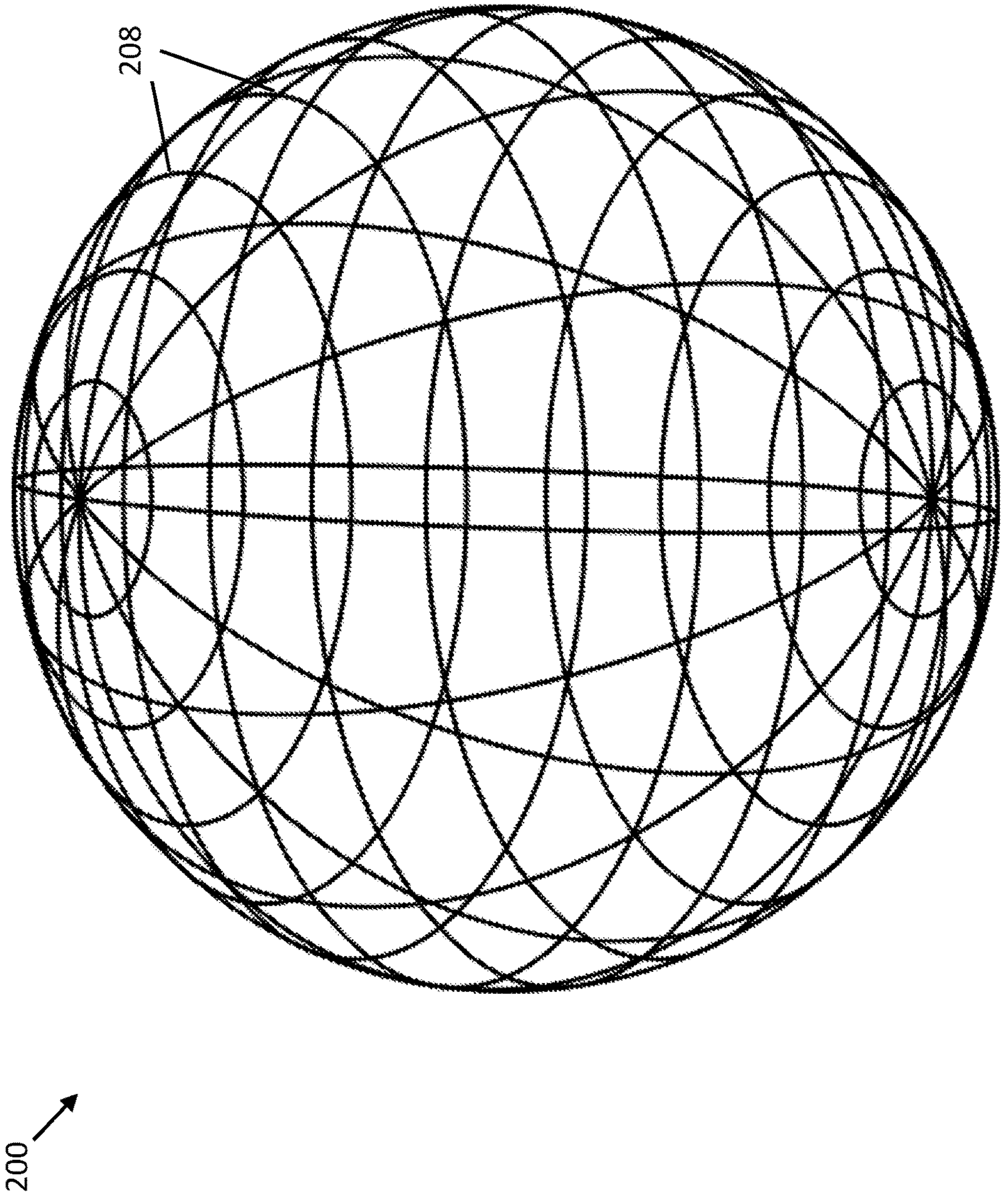

Other embodiments of the spherical dipole antenna 200 can be implemented as shown in FIG. 2B. In FIG. 2B, the spherical dipole antenna 200 includes azimuthal conductors 208 for differing spherical elevation angles, where the resulting electric current density of each conductor 208 is proportional to the sine of the spherical elevation angle. There embodiments are likely to require non-zero gaps between the adjoining azimuthal conductors 208 on the spherical surface, which could induce lobing effects.

Another embodiment (not shown) of the spherical dipole antenna 200 includes a thin spherical shell of electric current. In these embodiments, the thickness of the shell varies as the sine of the spherical elevation angle to obtain the required electric current density which also scales as the sine of the spherical elevation angle.

It is likely that most physically realizable implementations of the spherical antenna 200 will have little or no electric current for some nonzero span of spherical elevation angles near the two poles. In other words, little or no electric current will flow for θ values with $0>\theta>\theta_0$ or $\pi-\theta_0>\theta>\pi$, in terms of a threshold spherical polar angle $0<\theta_0$.

Embodiments herein use a model that examines a source electric current density that flows on the surface of a sphere, which is assumed to be of radius a. This surface current flows in the azimuthal direction about some axis passing through the centre of the sphere, which is assumed to be the $\hat{z}$ axis of a Cartesian coordinate system. The temporal dependence of this current flow is permitted to be a general function $\psi(t)$ of time t but can be assumed to correspond to that of simple sinusoidal variation in time as an example case. In addition, the magnitude of this surface electric current density is selected to be proportional to the sine of the spherical elevation angle θ. Thus, the electric current density on the sphere surface is:

$$K(r,t)=\tilde{I}\sin(\theta)\hat{\phi}(\phi)\psi(t), \tag{1}$$

with $\tilde{I}$ equal to a constant parameter which is directly proportional to the total electric current on the surface of the sphere.

In Equation (1), the position vector r={r, θ, φ} defines the radius, elevation angle, and azimuthal angle, respectively, for spherical coordinates in which the origin lies at the sphere centre. The form in Equation (1) conveys that the spherical unit vectors $\{\hat{r}(\theta,\phi), \hat{\theta}(\theta,\phi), \hat{\phi}(\phi)\}$ vary with θ and φ. The following is used to transform between spherical coordinates r={r, θ, φ} and Cartesian coordinates r≡{x, y, z}:

$$x=r\sin(\theta)\cos(\phi),$$

$$y=r\sin(\theta)\sin(\phi),$$

$$z=r\cos(\theta). \tag{2}$$

The analysis herein invokes the standard definition of the one-dimensional (1-D) Dirac delta function δ(·):

$$\delta(x-b)=0,\ \text{for } x\neq b. \tag{3}$$

The second part of the 1-D delta function definition is $$\int_q^p \delta(x-b)dx = \begin{cases} 1, & \text{for } q<b<p \\ 0, & \text{otherwise} \end{cases}. \tag{4}$$

Equations (3) and (4) give the standard result:

$$\int_q^p f(x)\delta(x-b)dx = \begin{cases} f(b), & \text{for } q<b<p \\ 0, & \text{otherwise} \end{cases}. \tag{5}$$

Using Equations (3)-(5) and the surface electric current density K(r, t) of Equation (1) permits the corresponding volumetric electric current density J(r, t) to be expressed as $$J(r,t) = \frac{I_0}{2}\frac{\delta(r-a)}{r}\sin(\theta)\hat{\phi}(\phi)\psi(t), \tag{6}$$

for a sphere of radius r=a. Equation (6) is expressed in terms of a parameter $I_0$ that is equal to the total electric current flowing on the surface of the sphere. Thus, $I_0\psi(t)$ is the total instantaneous electric current on the sphere surface. The rationale for selecting the various coefficients and the exponential powers of r in Equation (6) follows from a detailed calculation of $I_0$ and is described below.

For much of the remainder of this analysis, a single Fourier harmonic of the temporal variation of the EM field is assumed. Denote the angular frequency for this single Fourier harmonic to be w and the corresponding wavenumber via k. Next, examine a single harmonic of J(r, t) in Equation (6):

$$J(r) = \frac{I_0}{2}\frac{\delta(r-a)}{r}\sin(\theta)\hat{\phi}(\phi). \tag{7}$$

After single-harmonic solutions for the EM fields have been computed, standard methods can be used to generate the fields for an arbitrary temporal variation of $\psi(t)$.

The electric current density flows azimuthally in the $\hat{\phi}(\phi)$ direction about the $\hat{z}$ axis of the spatially fixed Cartesian unit vectors $\{\hat{x}, \hat{y}, \hat{z}\}$. Coordinate transformations enable $\hat{\phi}(\phi)$ to have the form:

$$\hat{\phi}(\phi)=-\sin(\phi)\hat{x}+\cos(\phi)\hat{y}, \tag{8}$$

so that J(r) in Equation (7) can be expressed as $$J(r') = \frac{I_0}{2}\frac{\delta(r'-a)}{r'}\sin(\theta')\{-\sin(\phi')\hat{x}+\cos(\phi')\hat{y}\}. \tag{9}$$

Here and throughout the remainder of this analysis, spatial points corresponding to the source electric current are denoted using primed coordinates r', whereas observation spatial points are shown with unprimed coordinates r.

The present approach involves the calculation of the vector potential A(r) based on the selected form of the electric current density J(r'). Following similar prior analyses, the present investigation seeks solutions for A(r) via $$A(r) \equiv \frac{\mu}{4\pi}\int d^3r' \frac{J(r')\exp(-ikR(r,r'))}{R(r,r')}, \tag{10}$$

in terms of the imaginary unit $i=\sqrt{-1}$, the magnetic permeability μ, the volumetric integration element $\alpha^{\beta}r'$, and the distance R(r, r') between a source point r' and an observation point r:

$$R(r,r')\equiv|r-r'|=\sqrt{\{x-x'\}^2+\{y-y'\}^2+\{z-z'\}^2}. \tag{11}$$

Embodiments herein use an exact analytic solution of Maxwell's equations for a spherically shaped and azimuthally flowing source electric current density. The magnitude of this surface electric current density is proportional to the sine of the spherical elevation angle. Further, the final solution of the EM fields is expressed in simple closed form in terms of a small number of elemental functions. These radiative fields correspond to an exact solution of Maxwell's equation, without the need for approximations based on the relative values of the EM wavelength, sphere radius, and observation point.

The form of the EM radiation resulting from the subject spherical current density corresponds to a pure dipole with the absence of any higher order multiple contributions, even in the near field. Such an ideal radiator may offer utility in new but yet unforeseen applications for radar and communications. If a physically realized antenna provides a good approximation for this idealized concept, then the resulting near-field EM radiation is expected to exhibit primarily dipole characteristics.

Spherical radiators 200 described herein may offer the potential of transmitting fields with little or no energy in the higher-order multipole radiative components. The weaker near-field effects for the subject spherical electric current density imply that generally there will be less interaction, and thus reduced interference, with the platform and frame onto which the proposed spherical antenna is structurally mounted.

Below is confirmation that the volumetric electric current density J(r) in Equation (7) is consistent with $I_0$ being equal to the total electric current flowing on the surface of the sphere of radius r=a. This analysis begins with J(r) expressed in terms of discrete charge carriers. This J(r) can be carried by one or more charged carrier species, as with electrons and holes in semiconductors. Suppose that the carriers of a given species σ each have a charge $q_\sigma$ and are characterized via a volumetric number density function $n_\sigma(r)$ and a mean velocity field u AO. The corresponding J(r, t) is found by summing over all charge carrier species σ via:

$$J(r) \equiv \sum_{\sigma} q_\sigma n_\sigma(r) u_\sigma(r). \tag{12}$$

For the case of multiple charge carriers σ, there is an infinite variety of combinations of the $q_\sigma$, $n_\sigma(r)$ and u AO which give the same J(r). Even for a single carrier species of charge q, there is an infinite variety of n(r) and u(r) which yield identical forms of J(r). However, regardless of the particular q, n(r) and u(r) selected to generate a specific form of J(r), this particular J(r) corresponds to a single unique value of the total electric current $I_0$. Thus, without loss in generality, assume a single carrier species of charge q and then select the forms of n(r) and u(r) which are consistent with the specified J(r) and which also facilitate the calculation of $I_0$:

$$J(r)=qn(r)u(r). \tag{13}$$

Begin by selecting a uniform number density of charge carriers on the surface of a sphere of radius r=a:

$$n(r) = \frac{N_0}{4\pi r^2}\delta(r-a). \tag{14}$$

Here, δ(r−a) is equal to a 1-D radial delta function of Equations (3)-(5). Also, $N_0$ equals the total number of carriers, each having charge q, which are moving on the sphere surface. The form of Equation (14) is consistent with standard delta function densities on the surface of a sphere. The integral of this number density over all space yields the expected value of $N_0$:

$$\int d^3 r n(r) = 4\pi \int_0^\infty dr r^2 \frac{N_0}{4\pi r^2}\delta(r-a) = N_0. \tag{15}$$

Next, assume that the mean carrier velocity u(r) flows in the $\hat{\phi}(\phi)$ direction and is proportional to r sin(θ):

$$u(r)=\Omega_0 r \sin(\theta)\hat{\phi}(\phi). \tag{16}$$

Here, the proportionality constant $\Omega_0$ is an angular velocity, so that a given charged carrier traverses a constant- θ latitude around the sphere and arrives back to its original position at time $T_0$:

$$T_0 = \frac{2\pi}{\Omega_0}. \tag{17}$$

Specifically, charged carriers at different latitudes θ arrive at their respective original starting positions after the same temporal period of $T_0$. Again, the selected n(r) and u(r) in Equations (14) and (16), respectively, are not unique for a given J(r) in Equation (7) but are convenient in calculating the total electric current $I_0$. Substitution of Equations (14) and (16) into Equation (13) yields:

$$J(r) = \frac{qN_0\Omega_0}{4\pi r}\delta(r-a)\sin(\theta)\hat{\phi}(\phi). \tag{18}$$

In this simplified model of J(r), the total amount of charge carrier on the surface of the sphere is $qN_0$, since there are a total of No charge carriers on the sphere surface. Also, each of these charge carriers travels around the sphere in the $\hat{\phi}(\phi)$ direction with the same constant angular frequency $\Omega_0$, and thus each arrives at its respective initial starting position after the same time interval of $T_0$ in Equation (17). Thus, the total electric current $I_0$ is equal to the ratio of the total moving charge $qN_0$ over the time $T_0$ for each charge carrier to traverse a constant θ latitude about the sphere and arrive at its initial starting location:

$$I_0 = \frac{qN_0}{T_0} = \frac{qN_0\Omega_0}{2\pi}. \tag{19}$$

Thus, Equation (19) gives $qN_0\Omega_0=2\pi I_0$ to be used in Equation (18) to obtain Equation (7), which is the intended result. Again, Equation (7) applies for any selection of the $q_\sigma$, $n_\sigma(r)$, and $u_\sigma(r)$ which give the required J(r) in Equation (12), although the derivation of the relationship between J(r) and $I_0$ for alternative choices of the $q_\sigma$, $n_\sigma(r)$, and $u_\sigma(r)$ may be less obvious than for that of Equations (14) and (16) presented herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A communication device radiating a purely dipole structure, the device comprising:

a metallic sphere having a central axis; and electrical wiring wound azimuthally around the central axis of the metallic sphere so that an electric current density of the electric wiring is proportional to a sine of a spherical elevation angle of the metallic sphere, wherein a magnitude of the electric current density of the electric wiring is selected to be proportional to the sine of the spherical elevation angle according to:

$$K(r,t)=\tilde{I}\sin(\theta)\hat{\phi}(\phi)\psi(t),$$

wherein K(r, t) is the electric current density on a surface of the metallic sphere as a function of a position vector (r) and time (t), $\tilde{I}$ is a constant parameter that is directly proportional to a total electric current of the surface of the metallic sphere, θ is the spherical elevation angle, ϕ is an azimuthal angle of the metallic sphere, $\hat{\phi}$ is an azimuthal dependence function, and ψ is a temporal dependance function.

2. A communication device radiating a purely dipole structure, the device comprising:

a metallic sphere having spherical elevation angles; and disconnected azimuthal conductors, each azimuthal conductor having a magnitude of an electric current density that is selected to be proportional to a sine of one of the spherical elevation angles, wherein gaps exist between the azimuthal conductors and the metallic sphere, and adjacent azimuthal conductors are separated by conductor gaps.

3. The communication device of claim 2, wherein the magnitude of the electric current density of each azimuthal conductor is selected to be proportional to the sine of the spherical elevation angle according to:

$$K(r,t)=\tilde{I}\sin(\theta)\hat{\phi}(\phi)\psi(t),$$

wherein K(r, t) is the electric current density on a surface of the metallic sphere as a function of a position vector (r) and time (t), $\tilde{I}$ is a constant parameter that is directly proportional to a total electric current of the surface of the metallic sphere, θ is the spherical elevation angle, ϕ is an azimuthal angle of the metallic sphere, $\hat{\phi}$ is an azimuthal dependence function, and ψ is a temporal dependance function.

4. The communication device of claim 2, wherein the magnitude of the electric current density of each azimuthal conductor is selected to be proportional to the sine of the spherical elevation angle according to:

$$J(r,t)=\frac{I_0}{2}\frac{\delta(r-a)}{r}\sin(\theta)\hat{\phi}(\phi)\psi(t),$$

wherein J(r, t) is the electric current density of a volumetric position of the metallic sphere as a function of a position vector (r) and time (t), r is a radial position within the metallic sphere, a is a radius of the metallic sphere, $I_0$ is a total electric current of a surface of the metallic sphere, θ is the spherical elevation angle, ϕ is an azimuthal angle of the metallic sphere, $\hat{\phi}$ is an azimuthal dependence function, and ψ is a temporal dependance function.

5. The communication device of claim 2, wherein the magnitude of the electric current density of each azimuthal conductor is selected to be proportional to the sine of the spherical elevation angle according to:

$$J(r)=\frac{qN_0\Omega_0}{4\pi r}\delta(r-a)\sin(\theta)\hat{\phi}(\phi),$$

wherein J(r) is the electric current density of a volumetric position of the metallic sphere as a function of a position vector (r), r is a radial position within the metallic sphere, a is a radius of the metallic sphere, $qN_0$ is a total amount of charge carrier on a surface of the metallic sphere, $\Omega_0$ is a constant angular frequency, θ is the spherical elevation angle, ϕ is an azimuthal angle of the metallic sphere, $\hat{\phi}$ is an azimuthal dependence function, and ψ is a temporal dependance function.

6. A communication device radiating a purely dipole structure, the device comprising:

a metallic sphere having spherical elevation angles; and a spherical shell of electric current surrounding the metallic sphere, the spherical shell having a plurality of thicknesses that each have a magnitude of electric current density that is selected to be proportional to a sine of one of the spherical elevation angles.

7. The communication device of claim 6, wherein each of the magnitude of the electric current density is selected to be proportional to the sine of the spherical elevation angle according to:

$$K(r,t)=\tilde{I}\sin(\theta)\hat{\phi}(\phi)\psi(t),$$

wherein K(r, t) is the electric current density on a surface of the metallic sphere as a function of a position vector (r) and time (t), $\tilde{I}$ is a constant parameter that is directly proportional to a total electric current of the surface of the metallic sphere, θ is the spherical elevation angle, ϕ is an azimuthal angle of the metallic sphere, $\hat{\phi}$ is an azimuthal dependence function, and ψ is a temporal dependance function.

8. The communication device of claim 6, wherein each of the magnitude of the electric current density is selected to be proportional to the sine of the spherical elevation angle according to:

$$J(r,t)=\frac{I_0}{2}\frac{\delta(r-a)}{r}\sin(\theta)\hat{\phi}(\phi)\psi(t),$$

wherein J(r, t) is the electric current density of a volumetric position of the metallic sphere as a function of a position vector (r) and time (t), r is a radial position within the metallic sphere, a is a radius of the metallic sphere, $I_0$ is a total electric current of a surface of the metallic sphere, θ is the spherical elevation angle, ϕ is an azimuthal angle of the metallic sphere, $\hat{\phi}$ is an azimuthal dependence function, and ψ is a temporal dependance function.

9. The communication device of claim 6, wherein each of the magnitude of the electric current density is selected to be proportional to the sine of the spherical elevation angle according to:

$$J(r)=\frac{qN_0\Omega_0}{4\pi r}\delta(r-a)\sin(\theta)\hat{\phi}(\phi),$$

wherein J(r) is the electric current density of a volumetric position of the metallic sphere as a function of a position vector (r), r is a radial position within the metallic sphere, a is a radius of the metallic sphere, $qN_0$ is a total amount of charge carrier on a surface of the metallic sphere, $\Omega_0$ is a constant angular frequency, $\theta$ is the spherical elevation angle, $\phi$ is an azimuthal angle of the metallic sphere, $\hat{\phi}$ is an azimuthal dependence function, and $\psi$ is a temporal dependance function.

* * * * *